(12) United States Patent
Webber et al.

(10) Patent No.: US 7,131,661 B2
(45) Date of Patent: Nov. 7, 2006

(54) AIRBAG MODULE AND A METHOD FOR THE ATTACHING OF AN AIRBAG TO AN AIRBAG HOLDER

(75) Inventors: James Lloyd Webber, Shelby Township, MI (US); Sabina Asic, Wuppertal (DE)

(73) Assignee: Delphi Technologies, Inc., Troy, MI (US)

( * ) Notice: Subject to any disclaimer, the term of this patent is extended or adjusted under 35 U.S.C. 154(b) by 346 days.

(21) Appl. No.: 10/407,156

(22) Filed: Apr. 3, 2003

(65) Prior Publication Data

US 2004/0041371 A1 Mar. 4, 2004

Related U.S. Application Data

(60) Provisional application No. 60/371,480, filed on Apr. 10, 2002, provisional application No. 60/371,308, filed on Apr. 10, 2002, provisional application No. 60/371,076, filed on Apr. 9, 2002.

(51) Int. Cl.
*B60R 21/16* (2006.01)
(52) U.S. Cl. ............... 280/728.2; 280/743.1; 280/731
(58) Field of Classification Search ............. 280/728.2, 280/743.1, 728.1, 731
See application file for complete search history.

(56) References Cited

U.S. PATENT DOCUMENTS

| | | | | |
|---|---|---|---|---|
| 4,828,286 A | * | 5/1989 | Fohl | 280/731 |
| 5,421,607 A | * | 6/1995 | Gordon | 280/728.2 |
| 5,427,406 A | * | 6/1995 | Zushi et al. | 280/728.2 |
| 5,544,911 A | * | 8/1996 | Vine | 280/728.2 |
| 5,560,643 A | * | 10/1996 | Lang et al. | 280/728.2 |
| 5,762,364 A | * | 6/1998 | Cuevas | 280/731 |
| 5,791,682 A | * | 8/1998 | Hiramitsu et al. | 280/728.2 |
| 5,826,913 A | * | 10/1998 | Mramor | 280/728.2 |
| 6,135,492 A | | 10/2000 | Zimmerbeutel et al. | |
| 6,286,858 B1 | | 9/2001 | Sheperd et al. | |
| 6,361,064 B1 | | 3/2002 | Hopf et al. | |
| 6,422,589 B1 | | 7/2002 | Ostermann et al. | |
| 6,565,113 B1 | | 5/2003 | Kassman et al. | |
| 6,626,455 B1 | | 9/2003 | Webber et al. | |
| 6,786,504 B1 | * | 9/2004 | Lorenz et al. | 280/728.2 |

FOREIGN PATENT DOCUMENTS

| | | |
|---|---|---|
| DE | 197 49 914 A1 * | 5/1999 |
| DE | 201 14 507 U1 * | 2/2002 |
| WO | WO 97/34783 A1 * | 9/1997 |

* cited by examiner

*Primary Examiner*—Ruth Ilan
(74) *Attorney, Agent, or Firm*—Scott A. McBain (57) ABSTRACT

An airbag module includes an airbag holder, which has a base body and a projection on a peripheral surface of the base body extending around this in full or with the exception of at least one interruption, and an airbag which has an airbag mouth whose peripheral contour is smaller than a peripheral contour enclosing the projection and the base body and which is held at the airbag holder in an end position in which the airbag mouth encloses the base body and thereby engages behind the projection at a first side of the projection.

11 Claims, 7 Drawing Sheets

AIRBAG MODULE AND A METHOD FOR THE ATTACHING OF AN AIRBAG TO AN AIRBAG HOLDER

Applicant claims priority to U.S. Provisional Application 60/371,076 filed Apr. 9, 2002. Applicant also claims priority to U.S. Provisional Application 60/371,308 filed Apr. 10, 2002. Applicant also claims priority to U.S. Provisional Application 60/371,480 filed Apr. 10, 2002.

TECHNICAL FIELD

The present invention relates to an airbag module and to a method for the attaching of an airbag to an airbag holder of an airbag module.

BACKGROUND OF THE INVENTION

Airbags are provided in many motor vehicles in order to protect the occupants of the motor vehicle in the event of a collision of the motor vehicle with an obstacle from striking objects in the passenger compartment or boundaries of the passenger compartment without cushioning.

For this purpose, a conventional airbag has an airbag module which includes a gas generator and an airbag having an opening called an airbag mouth. In the event of a collision, the gas of the gas generator is led through the airbag mouth into the airbag, whereby the airbag is inflated and unfolded.

In this connection, the airbag is held at an airbag holder of the airbag module, for example at a housing or at a base body of the airbag module so that it cannot release from the airbag module on the supply of the gas of the gas generator and the unfolding caused thereby. A plurality of attachment elements such as bolts or screws are used for the attaching of the airbag mouth.

This kind of attachment, however, has the disadvantage that the number of required installation steps on the attaching of the airbag to the airbag holder also increases with the number of the attachment elements and results in a high production effort.

SUMMARY OF THE INVENTION

It is therefore the underlying object of the present invention to provide an airbag module having an airbag holder and an airbag which can be attached to the airbag holder in a simple manner and to provide a method with which an airbag can be simply fixed to an airbag holder of an airbag module.

An airbag module of the invention in accordance with the first alternative includes an airbag holder, which has a base body and a projection on a peripheral surface of the base body which extends around this as a whole or with the exception of at least one interruption, and an airbag which has an airbag mouth whose peripheral contour is smaller than a peripheral contour enclosing the projection and the base body and which is held at the airbag holder in an end position in which the airbag mouth encloses the base body and thereby engages behind the projection at a first side of the projection, with the projection and the airbag mouth being designed such that, for the installation of the airbag to the airbag holder, a first section of a rim of the airbag mouth can be guided behind the projection at a first side of the projection and thereby a second section of the rim adjoining the first section is arranged at a second side of the projection opposite the first side and such that the rim can be moved into the end position by a deformation.

With this method in accordance with the invention for the attaching of an airbag, which has an airbag mouth bounded by a peripheral rim, to an airbag holder which has a base body and a projection on a peripheral surface of the base body which extends around this as a whole or with the exception of at least one interruption, a first section of a rim of the airbag mouth is guided beyond the projection, behind the same, and a second section of the rim, complementary to the first section, is moved via a deformation of the airbag mouth into an end position in which the rim encloses the base body and thereby engages behind the projection.

The airbag of the airbag module of the invention in accordance with the first alternative can be attached to the airbag holder of the airbag module of the invention in accordance with the first alternative using the method of the invention in accordance with the first alternative.

The airbag holder therefore has a base body which is enclosed in the end position by the airbag mouth, that is by a corresponding opening of the airbag. A possible movement of the airbag in directions tangential to the rim of the airbag mouth is hereby restricted. The projection at the airbag holder, which is formed in full, or with the exception of at least one interruption, on a peripheral surface of the base body, restricts a movement of the airbag mouth, and thus of the airbag, from the end position beyond the projection, since the peripheral contour of the airbag mouth is smaller than a peripheral contour around the airbag holder enclosing the projection and the base body. The peripheral contour of the airbag in the end position is here understood as that peripheral contour which is present when the airbag mouth, or its rim, is not deformed, and is in particular not expanded by active forces. The peripheral contour of the base body, on the other hand, is understood as an envelope which surrounds the base body and the projection. If the projection is interrupted, the envelope will therefore span the interruption smoothly.

Overall, this means that the projection and the airbag mouth, with its rim, are made such that the airbag in the end position is not movable beyond the projection by a deformation.

In this connection, the projection is preferably arranged such that it limits a movement of the airbag mouth caused by an unfolding of the airbag, that is such that the airbag mouth is held by the projection without the airbag being able to be pulled off from the airbag holder by the forces occurring on the unfolding of the airbag by a gas development or gas expansion. For this purpose, the peripheral contours of the projection and the airbag mouth are preferably formed such that the airbag mouth can also not be pulled over the projection on the unfolding of the airbag.

Since the airbag is hindered from a movement beyond the projection solely by the differences in the peripheral contours of the airbag mouth and of the base body with the projection and since furthermore a movement transversely hereto is limited by the base body, an attachment of the airbag results without further aids such as separate pins, rivets, screws or also attachment rings.

The projection and the airbag mouth are furthermore designed such that the airbag can be attached to the airbag holder in that the airbag mouth is moved over the projection under deformation. For this purpose, the air bag mouth is first led at a first section of a rim of the airbag mouth behind the projection, with the remaining complementary section of the airbag mouth being arranged on the second side of the projection. Since the airbag mouth has a smaller peripheral contour in the undeformed state than the base body with the projection, the complementary section can only be guided over the projection by a deformation of the airbag mouth, with a displacement of the deformed airbag mouth being able to take place simultaneously. This deformation can be a deformation without any substantial stretching of the peripheral contour, on the one hand. For example, a circular airbag mouth can be deformed to an oval. However, the rim of the airbag mouth can also be stretched alone or additionally to enable a movement of the complementary section of the rim of the airbag mouth into the end position. The required deformation is expediently such that it does not occur due to the forces acting onto the airbag mouth on a triggering of an airbag unfolding.

After the airbag mouth has been guided behind the projection, the deformation can expediently be at least partly reversed again.

The airbag mouth should be as small as possible to achieve the largest possible gas impermeability of the attachment, but must, on the other hand, be large enough to be attachable in accordance with the invention to the airbag holder behind the projection. For this reason, the shape and size of the base body on both sides of the projection, or those of the corresponding peripheral contours, those of the projection itself or of the corresponding peripheral contour and those of the airbag mouth are expediently selected in dependence on one another, with the aforesaid requirements having to be satisfied for the holding function, with it generally being advantageous with respect to the attachment behavior for the peripheral contour of the base body to be as small as possible with respect to that of the projection on at least one side of the projection.

Except for a deformation and, optionally, a displacement of the airbag mouth, this method does not require any further handling of attachment means such as were mentioned above, whereby the installation process is substantially simplified.

A very simple attachment of an airbag to a corresponding airbag holder thus results overall without the use of further attachment means.

The projection is preferably made as a ring flange, whereby a uniform force transmission is achieved with a simultaneously good sealing between the airbag mouth and the ring flange.

It is preferred for the simpler manufacture of the airbag holder in accordance with the invention for the base body to be made in one piece with the projection. Moreover, a stable connection is thus achieved between the projection and the base body, which is in particular advantageous in view of the forces occurring on an unfolding of the airbag, with the base body and the projection being able to be made as a plastic injection molded part or as a die cast part.

The base body is particularly favorably made in one piece with the projection such that the airbag mouth cannot be removed from the base body out of the end position in a direction opposite to the projection in a destruction free manner. For this purpose, the base body can, for example, have corresponding further projecting regions or also a peripheral flange. The base body can in particular be made in one piece with a support plate of the airbag module with which the airbag module can be attached to a motor vehicle. Such an airbag module is characterized by a very low number of individual parts.

It is preferred with the method in accordance with the invention for the airbag mouth to be expanded on the deformation, with the expansion, which can in particular be accompanied by a change in the shape of the airbag mouth, preferably taking place in the elastic region, that is for the length of the peripheral contour of the airbag mouth to be substantially the same before and after the expansion. The airbag mouth can hereby engage further behind the projection in the end position such that the airbag mouth can be moved over the projection with a great deal more difficulty or not at all by the forces occurring on an unfolding or inflating of the airbag. For this purpose, a tool can be used, for example, with one or also two lever-like elements which are used, similar to the mounting of tires on hubs, to move the complementary section of the airbag mouth beyond the projection with a simultaneous expansion on the installation.

The airbag module in accordance with the invention includes an airbag holder, which has a base body and a projection formed at a peripheral surface of the base body, and an airbag which has an airbag mouth whose peripheral contour is smaller than a peripheral contour which surrounds the projection and the base body and which is held at the airbag holder in an end position in which the airbag mouth surrounds the base body and thereby engages behind the projection at a first side of the projection, with the projection having a cut-out which extends from the first side of the projection through this to a second side opposite the first side, and with the projection with the cut-out and the airbag mouth being designed such that, for the installation of the airbag at the airbag holder, an introduction section of a rim of the airbag mouth can be inserted into the cut-out and with a first section of the rim adjoining the introduction section being arranged on the first side of the projection and a second section of the rim adjoining the introduction section being arranged on the second side of the projection and such that the rim can then be moved into the end position by a rotational movement relative to the base body and/or by at least one displacement and/or by an expansion of the rim.

With this second method in accordance with the invention for the attaching of an airbag, which has an airbag mouth bounded by a peripheral rim, to an airbag holder which has a base body and a projection which is formed at a peripheral surface of the base body and has a cut-out which extends from a first side of the projection, through this, to a second side opposite the first side, an introduction section of a rim of the airbag mouth is inserted into the cut-out, with adjacent first and second sections of the edge being arranged on the first side or on the second side of the projection respectively, and the rim is moved into an end position, in which the rim surrounds the base body and thereby engages behind the projection, by a rotational movement relative to the base body and/or at least one displacement and/or an expansion of the rim.

As with the airbag module of the invention in accordance with the first alternative, with the airbag module of the invention in accordance with the second alternative, the airbag is held at the airbag holder or at the projection in that the peripheral contour of the airbag mouth in the end position is smaller than the peripheral contour of the base body with the projection, with it being understood by a peripheral contour of the projection and of the base body that the peripheral contour is supplemented as smoothly as possible over the cut-out of the projection in the manner of an envelope such that the extension of the actual peripheral contour created by the cut-out is not included, with the peripheral contour of the airbag in the end position being understood as the peripheral contour which is present when the airbag mouth, or its rim, is not deformed and in particular is not stretched by active forces. It is also preferably particularly understood under the fact that the peripheral contour of the airbag mouth is smaller than the peripheral contour of the base body with the projection that the length of the peripheral contour of the airbag mouth is smaller in a state in which it is not stretched by external forces than the length of the peripheral contour of the projection and of the base body when the shapes of these peripheral contours are otherwise similar. Furthermore, it is also understood under this fact that that, in the final position, the shape of the airbag mouth differs from that of the base body and of the projection such that a pulling off of the airbag from the base body beyond the projection is not possible.

This means that the projection with the cut-out and the airbag mouth with its rim are formed such that the airbag in the end position is not movable beyond the projection merely by a displacement.

The airbag of the airbag module of the invention in accordance with the second alternative is attachable to the airbag holder of the airbag module in accordance with the second alternative with the second method in accordance with the invention for the attachment.

The attachment is substantially simplified here by the cut-out which extends through the projection. For the attachment of the airbag, this is introduced into the cut-out with an introduction section of the rim of the airbag mouth, with the first section and the second section, which are adjacent to the introduction section, coming to rest on its first or second side respectively. The sections of the airbag mouth which do not yet engage behind the projection in this position, that is are arranged on the second side, now only need to be moved over a region of the base body with the projection which has a shortened peripheral contour. For this purpose, the airbag rim can be brought into the end position by a rotational movement around the base body and relative thereto, optionally combined with a displacement relative to the base body and/or to an expansion. It is, however, also possible to bring the airbag into the end position by a plurality of sequential displacements of the airbag or of the airbag holder taking place in different directions, optionally again while expanding the airbag mouth. Finally, it is also possible to move the section of the airbag mouth still located on the second side of the projection beyond and behind the projection by an expansion alone, which can preferably be substantially reversible, as described above in the method according to the first alternative.

For the achievement of gas impermeability, the airbag module should be as small as possible, but must, on the other hand, be large enough to be attachable to the airbag holder in accordance with the invention behind the projection. The shapes and sizes of the base body on both sides of the projection or those of the corresponding peripheral contours, those of the projection itself or of the corresponding peripheral contour, those of the cut-out and those of the airbag mouth are therefore expediently suitably chose in dependence on one another, with the aforesaid requirements being able to be satisfied for the holding function, with it generally being advantageous with respect to the attachment method for the peripheral contour of the base body to be as small as possible with respect to that of the projection on at least one side of the projection and/or for the cut-out to extend far in the direction toward the base body.

The use of the cut-out allows a particularly simple installation of the airbag to the airbag holder, with in particular an expansion of the airbag mouth or of its rim being able to be avoided. Moreover, a particularly wide engaging behind of the projection by the rim of the airbag module is made possible, whereby a particularly secure attachment of the airbag against a movement of the airbag mouth beyond the projection, for example on the unfolding of the airbag, is prevented. The largely force-free or low force installation in the preferred case that substantially no expansion is carried out protects the airbag and the airbag holder against possible damage or material fatigue on the installation.

Although the cut-out considerably facilitates the movement of the airbag module beyond the projection, it does not reduce the security against a pulling off of the airbag from the airbag holder beyond the projection, since a movement sequence which corresponds to the sequence of movements on the installation in a reverse order is extremely unlikely or impossible on the basis of forces occurring in a possible accident.

An attachment in turn results of the airbag to the airbag holder without a further use of attachment means to be handled separately such as rivets, screws, pins or even attachment rings.

On the attachment of the airbag to the airbag holder, the airbag can be rotated with respect to the airbag holder held in a stationary manner. It is, however, preferred for the airbag holder to be rotated since the airbag is preferably attached in the non folded state and then a movement of the airbag holder can be brought about substantially more easily.

In accordance with the invention, the projection can also have more than one cut-out. The rim of the airbag mouth can then be inserted into any of the cut-outs such that a rotation about a smaller angle is sufficient to bring the rim completely behind the projection.

With the airbag module in accordance with the second alternative, it is preferred for the projection to be formed extending around the base body with the exception of the cut-out. It is particularly preferably formed as a ring flange. A particularly large contact surface is hereby achieved between the rim of the airbag mouth and the projection such that the airbag can be attached to the airbag holder with increased gas impermeability. Furthermore, a better distribution of forces on the airbag holder acting on the airbag on an unfolding thus results such that the risk of damage to the airbag mouth is greatly reduced.

The cut-out can generally have any design as long as it allows the installation in accordance with the invention of the airbag in accordance with the second alternative. It can, for example, be formed as a bulge. To achieve the greatest possible contact surface between the rim of the airbag mouth and the projection, it is preferred for the cut-out to be formed as a slot passing through the projection. Such a cut-out is moreover particularly simple to manufacture. Finally, it allows an increased gas impermeability of the airbag attachment due to a particularly narrow formation.

It is particularly preferred for this purpose for the slot to be less than 2 mm wider than the thickness of the airbag in the region of the rim, with the thickness of the airbag in the region of the rim being understood as the thickness of the rim including any reinforcements of the airbag mouth. In this manner, on the one hand, a simple insertion of the rim of the airbag into the recess or into the slot and an easy movability of the rim in the slot is made possible. On the other hand, the projection, which is preferably peripheral, is only interrupted over a very narrow region such that a larger contact surface is achieved between the projection and the rim of the airbag mouth which results in a more uniform distribution of forces along the rim of the airbag mouth when the airbag mouth is pulled out of the end position in the direction of the projection.

In this connection, the slot can extend radially to the periphery of the projection, that is orthogonally to a tangent at a periphery of the projection. It is, however, also possible for the slot to be inclined at a tangent to the periphery of the projection, that is to be made in an inclined or also swung manner from the periphery of the projection in the direction toward the base body.

Furthermore, it is preferred with the airbag module in accordance with the second alternative for one direction, in which at least one region of the slot passes through the projection, to be inclined with respect to a normal to a contact surface of the projection which the rim of the airbag connects in the end position or on being pulled in the direction of the projection. The inclination of the slot facilitates an insertion of the rim of the airbag mouth into the slot, in particular when this is tight, as well as a movement of the rim of the airbag module, when this is introduced into the slot, since the rim needs to be curved less.

The following preferred further developments and embodiments relate to the airbag modules in accordance with the invention or to methods for the attaching of an airbag in accordance with the two alternatives described above.

To prevent as securely as possible a pulling of the airbag from the airbag holder on an unfolding of the airbag, it is preferred for the peripheral contour of the airbag mouth to be as small as possible relative to that around the base body and around the projection.

Furthermore, for this purpose, the peripheral contour of the airbag mouth is preferably also smaller than that around the base body and around the projection with the forces acting on an unfolding of the airbag.

When an airbag module is triggered, gas is guided very quickly into the airbag. For this purpose, as little gas as possible should be able to escape along the airbag attachment. It is therefore preferred for a contact area of the projection, which the rim of the airbag mouth contacts in the end position or on being pulled in the direction of the projection, to be planar. The projection can in particular be made like a flange on the first side facing the airbag in the end position, with the contact area only needing to be planar on an elongate scale which the rim of the airbag mouth contacts by the forces acting at the start of an unfolding or of an inflating of the airbag. Beyond a good gas impermeability, a uniform force transfer from the rim of the airbag mouth to the projection is furthermore achieved on an unfolding or on an inflating of the airbag.

Since the airbag mouth encloses the base body behind the projection in the end position, but must simultaneously be movable over the projection, the airbag mount is limitedly movable relative to the base body in a direction transversely to the direction toward the projection. It is therefore preferred, in particular with a projection which is optionally peripheral with the exception of an interruption or of a cut-out, for a contact area of the projection, which the rim of the airbag mouth contacts in the end position or on being pulled in the direction of the projection, to have a conical shape. Due to the conical widening, that is the widening in the form of a cone or of a truncated cone, in the direction toward the projection, when the airbag is pulled in the direction of the projection, for example on the unfolding or inflating of the airbag, a self-centration of the airbag mouth at the airbag holder is achieved, whereby the gas impermeability is increased. The conical contact area particularly preferably has no recesses and/or grooves so that the airbag contacts the rim of the airbag mouth at the contact surface in as complete a manner as possible, whereby the gas impermeability of the airbag attachment is further improved.

The base body can generally have any desired cross-section in the regions adjacent to the projection. It is, however, preferred for a section of the base body adjoining the projection to have a circular cross-section, with the base body in particular being able to be formed as a hollow cylinder in the section in question. In particular an attachment of the airbag using a rotary movement is hereby facilitated.

It is furthermore preferred for the projection to have a circular outer contour. The airbag mouth is hereby loaded uniformly along the rim on an unfolding such that it does not move, or only moves a little, and is not deformed, or is only deformed a little.

The airbag mouth can generally have any desired suitable shape. To achieve the most uniform possible force transmission along the rim of the airbag mouth onto the projection, in particular when its periphery likewise has a circular shape, it is preferred for the airbag mouth to be substantially circular in shape.

It is alternatively preferred for the airbag mouth to be elliptical in shape. With the method in accordance with the invention, it is then preferred for a section of the rim which is substantially bounded by the ends of the longer main axis of the ellipse first to be guided over the projection as a first section, and then for the second section to be moved behind the projection into the end position. The installation of the airbag to the airbag holder is hereby substantially facilitated by the use of the longer main axis, with, however, the sections of the airbag mouth with a lower diameter, that is closer to the shorter main axis of the ellipse, being arranged closer to the base body and thus, in particular when a projection with a circular or circular segment form is used, engaging behind these further than the regions with the larger main axis. An increased gas impermeability is thus achieved.

With the method in accordance with the second alternative, it is particularly preferred in this connection for the airbag to be moved by a rotation into an end position in which the longer main axis of the elliptically shaped airbag mouth is not arranged in the region of the cut-out. No, or only a small, distance thus results between the airbag rim and the base body in the region of the cut-out such that only a little, or preferably no, gas can escape through the cut-out on the unfolding of an airbag.

On the unfolding or on the inflating of the airbag, strong forces can act on the rim of the airbag mount. It is therefore preferred for the rim to be reinforced at least section-wise. The reinforcement is particularly preferably formed along the total rim. This reinforcement serves in particular for the reduction of a stretching of the rim which could result in the periphery of the airbag mouth being expanded so far by the forces occurring on the unfolding or on the inflating of the airbag that it can be pulled beyond the projection.

The reinforcement can be achieved in the most varied manner.

In a preferred embodiment, the rim has a reinforcement ring, with this reinforcement ring being able to be welded to the actual airbag material or also being sewn into it. In this connection, the reinforcement ring should have a flexibility which is sufficiently large to move it behind the projection with the respective method in accordance with the invention. The reinforcement ring is preferably made from the same material as the airbag. Recycling is thus facilitated.

Alternatively, or additionally, it is preferred for the rim to be coated for the reinforcement. This coating can in particular be a coating of the same material from which the airbag is made. Such a reinforcement can be produced particularly easily. The airbag is particularly preferably formed as a whole from an already coated airbag material or airbag fabric.

It is alternatively, or additionally, preferred for this purpose for the rim to be formed by at least two layers of airbag material connected to one another. The airbag material, i.e. the areal material from which the airbag is made, can in particular be a coated or uncoated fabric. A layer formed by the airbag and a further layer of airbag material can particularly preferably be sewn or welded together, with in particular a plurality of stitches being able to be used which effect a greater reinforcement. A reinforcement of the airbag mouth thus results in a very simple manner by the double layer or multi-layer design.

For the reduction of a stretching of the airbag mouth on an unfolding or on an inflating of the airbag, it is furthermore preferred for the projection to have an undercut along at least part of its periphery on the side facing the airbag in the end position. The airbag rim can then, in particular, when it has been reinforced, be brought behind this undercut which makes a sliding of the airbag mouth off the projection more difficult when the airbag is pulled. Moreover, such an undercut forms an additional sealing against a gas discharge on the inflating of the airbag, in particular when the projection is peripheral in full or with the exception of one cut-out.

When only one projection is used, a movement of the airbag is only limited toward the projection, but not in the opposite direction. It is there fore preferred for a projection complementary to the projection to be provided which forms a groove at least section-wise with the projection for the receiving of the rim of the airbag, with the width of the groove being oriented on the thickness of the rim of the airbag mouth and particularly preferably only being so large that the rim of the airbag mouth is substantially held without clearance in a direction orthogonal to the extent of the groove. Not only a very good positioning of the airbag mouth thus results, but also an improvement in the gas impermeability, since a lifting of the rim of the airbag mouth from the contact surface is prevented.

The complementary projection in this connection does not necessarily have to be made peripheral. It is, however, preferred for the complementary projection to be formed as a flange extending round the base body. On the one hand, forces can hereby be better transmitted to this, which is in particular of importance when the airbag is pulled toward the complementary airbag on an unfolding. This is furthermore of importance when the airbag holder serves for the attachment of a toroidal airbag with two airbag mouths or with only one airbag mouth. On the other hand, the gas impermeability of the attachment can thus be improved.

For the simpler production and improvement of the mechanical stability, it is preferred for the airbag holder to be made in one piece. It can in particular be produced as an injection molded part made of a suitable plastic, for example of polyamide, in particular nylon, or as a die cast part.

It is furthermore preferred for the airbag holder to be made in one piece with a support element of the airbag module serving for the attachment of the airbag module. Such an airbag module is particularly simple to manufacture since the airbag holder and the support element can be produced as a single injection molded part, for example made of plastic, or as a die cast part. Furthermore, only a part needs to be handled on installation so that the installation is made substantially simpler. Finally, a particularly stable attachment of the airbag results, since no further connection points occur between the airbag holder and the support.

The airbag holder is preferably, particularly preferably also the support element and the airbag, made of the same material, with it particularly preferable being a plastic, in particular polyamide, preferably nylon. Such airbag modules can be recycled particularly easily.

In this connection, the airbag holder and/or the support element particularly preferably has a chamber for the reception of a gas generator of the airbag module. This formation allows a particularly compact design of the airbag module in accordance with the invention.

The airbag holder can furthermore preferably be made at least in part as a diffuser through which the gas discharged from a gas generator is led into the airbag. For this purpose, the base body can, for example, have corresponding gas discharge openings. A particularly simple and compact design of the airbag module in accordance with the invention also results here.

The airbag modules in accordance with the invention can in particular have conventional airbags with one airbag mouth or also toroidal airbags with two airbag mouths. Accordingly, the methods in accordance with the invention are suitable for use with corresponding airbags.

It is preferred for the airbag holder to have a further projection offset in an axial direction with respect to the projection at the periphery of the base body and for the airbag to be a toroidal airbag with a further airbag mouth which has a rim enclosing the base body in an end position and engaging behind the further projection and whose circumferential contour is smaller than a circumferential contour around a cross-section through the base body and the further projection. Such an airbag module, which is in particular suitable for use for a steering wheel or driver airbag, is characterized by a particularly simple attachment of the airbag, with the attachments of the two airbag mouths being able to be made in each case with the same or also with different methods in accordance with the invention.

BRIEF DESCRIPTION OF THE INVENTION

The present invention will now be explained further by way of example with reference to the drawings, in which.

DESCRIPTION OF THE PREFERRED EMBODIMENT

Figure 1:
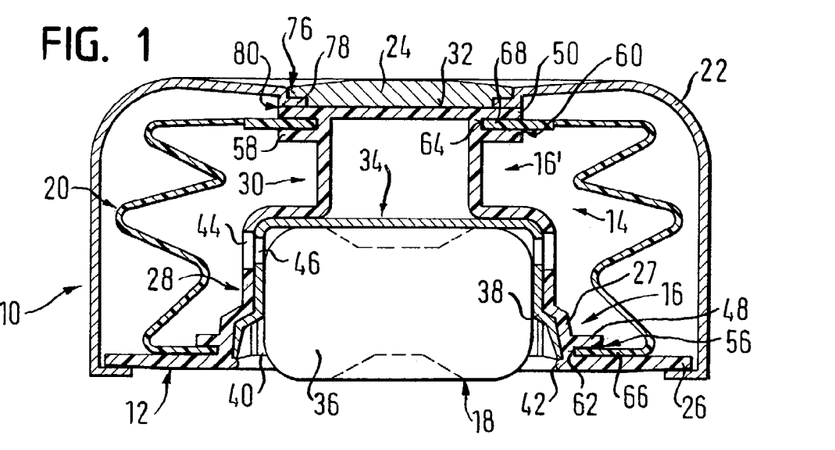
FIG. 1 is a schematic sectional view through an airbag module in accordance with a first preferred embodiment of the invention.

In FIG. 1, an airbag module 10 in accordance with a first preferred embodiment of the invention has a support element 12 having an airbag holder 14 formed thereon in one piece with airbag holder sections 16 and 16', a gas generator 18, an airbag 20, a cover 22 and a hub cover 24.

The substantially rotationally symmetrical support element 12, which is made in one piece as an injection molded part from polyamide, serves among other things for the attachment of the airbag module 10. Close to a base 26 formed in a flange-like manner, it has a wide mounting section 28 which is hollow cylindrical with the exception of a widening section 27 of truncated cone shape at the base side and is adjoined by a hollow cylindrical holding section 30 with smaller inner and outer diameters. The holding section 30 is closed at its free end, whereby the hub cover 24 is held at the terminal surface 32 which is formed.

The mounting section 28 thus forms a chamber 34 in which the gas generator 18 is arranged. The gas generator 18 has a conventional pressure unit 36 by mean of which gas for the inflating of the airbag 20 can be generated or in which gas is stored in compressed form. The pressure unit 36 is welded into a cup-like gas generator mount 38 which is made of a metal and whose rim has tongues 40 which are arranged in wreath form, are outwardly resilient and are latched behind an undercut 42 at the base-side end of an inner wall of the hollow cylindrical mounting section 28. The gas generator 18 is thus held between the undercut 42 and a shoulder formed between the hollow cylindrical region of the mounting section 28 and the widening section 27 of truncated cone shape.

The gas generator mount 38, as also the mounting section 28, have gas passage openings 44 and 46 which are arranged along their peripheries and coincide with one another and through which gas discharged by the pressure unit 36 can be guided into the airbag. The mounting section 28 thus also serves as a diffuser.

Figure 2:
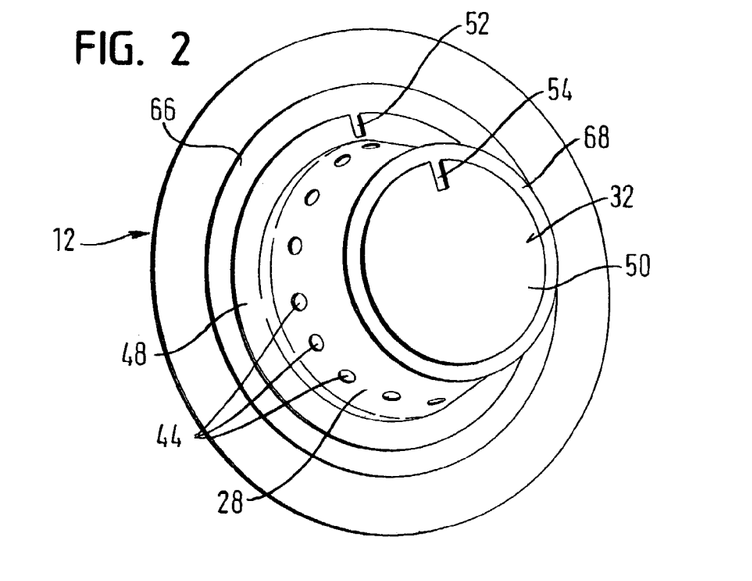
FIG. 2 is a perspective view of a support element with an airbag holder of the airbag module in FIG. 1 with rims of an airbag of the airbag module in FIG. 1.

Projections 48 and 40 with a circular peripheral contour and which each have the shape of a flange are arranged above the base 26 and flush with the terminal surface 32 and extend around the mounting section 28 and the holding section 30. Radially extending cut-outs 52 and 54, which pass through projections 48 and 50 orthogonally to the surface thereof, are formed in the shape of slots in the projections 48 and 50, said slots extending radially in each case up to the outer periphery of the mounting section 28 or of the holding section 30 (cf. FIG. 2).

The projection 48 is arranged so close to the base 26 that the base 26 formed close to the mounting section 28 as a peripheral flange forms a groove 56 of pre-determined width with the projection 48. In this respect, the base 26 forms a complementary projection to the projection 48.

On a first side of the projection 50 facing the gas generator 18, a peripheral complementary projection 58 is arranged, which is formed like a flange, such that the projection 50 and the complementary projection 58 form a groove 60 whose width is equal to that of the groove 56.

The mounting section 28, as the base body with the projection 48 and the base 26, and the holding section 30, as the base body with the projection 50 and the complementary projection 58, form airbag holder sections 16 or 16' of the airbag holder 14 which are independent of one another.

The toroidal airbag 20 shown only very schematically in FIG. 1, has two airbag mouths 62 and 64 which each have a rim 66 or 68.

Figure 3:
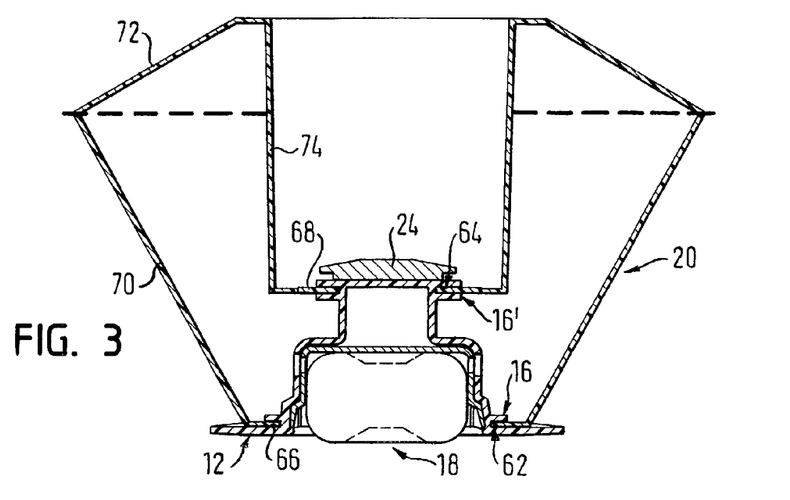
FIG. 3 is a schematic, partly sectional view through the airbag module in FIG. 1 with unfolded airbag.

The airbag 20 is sewn together from three airbag parts 70, 72 and 74 made of polyamide which corresponds to the polyamide of the support element 12 (cf. FIG. 3). The disk-shaped airbag parts 70 and 72 each have circular openings at their centers and are sewn together in gas impermeable form along their outer peripheries. The airbag part 74 is formed in tubular shape and sewn to the airbag part 72 along a rim. The opening in the airbag part 70 and the free edge of the airbag part 74 form the airbag mouths 62 and 64 respectively.

The airbag 20 is arranged in an end position relative to the airbag holder 14 in which the airbag is in a position ready for use. The rims 66 and 68 of the airbag mouths 62 and 64 respectively are thereby arranged in the grooves 57 and 60 respectively and thus in each case engage behind the projections 48 and 50 respectively.

The widths of the grooves 56 and 60, and thus the spacings of the projection 48 from the base 62 serving as the complementary projection and of the projection 50 from the complementary projection 58, are selected such that the rims 66 and 68 of the airbag mouths 62 and 64 respectively are substantially held without clearance in the grooves 56 and 60, with the rims 66 and 68 being able to be displaced in the grooved 56 and 60 without any substantial effort of force.

The diameters of the airbag mouths 62 and 64 are in this connection only a little larger than the corresponding outer diameters of the mounting section 28 or of the hollow cylindrical holding section 30, but are smaller than the outer diameters of the projections 48 and 50. The peripheral contour of the airbag mouths 62 and 64, which is circular in the undeformed state, is therefore smaller than the circular, enveloping peripheral contour of the projections 48 and 50 with the mounting section 28 and the holding section 30 as well as of the base 26 or of the complementary projection 58, with the difference in the diameters of the airbag mouths 62 and 64 and of the projections 48 and 50 being selected such that, when the airbag 20 is unfolded by gas of the gas generator 18, the airbag mouths 62 and 64 are held behind the projection 48 and 50. In this connection, the extensibility of the airbag material must be taken into account. Furthermore, the diameters of the mounting section 28, of the holding section 30, of the corresponding projections 48 and 50 and of the corresponding airbag mouths 62 and 64 and the depths of the cut-outs 52 and 54 are selected such that the airbag 20 can be attached to the airbag holder 14 with the method described further below in accordance with the first preferred embodiment of the invention.

For example, when an airbag of conventional polyamide fabric, in particular of nylon fabric, is used, the outer diameter of the projection 50 can amount to 100 mm and that of the holding section 30 to 80 mm, while the diameter of the airbag mouth 64 amounts to approximately 83.5 mm. With a substantially uniform pulling during the unfolding of the airbag 20, the airbag mouth 64 would have to be stretched by 20% in order to be pulled over the projection 50. Such a stretching can, however, not be reached on an unfolding of the airbag.

Figure 4:
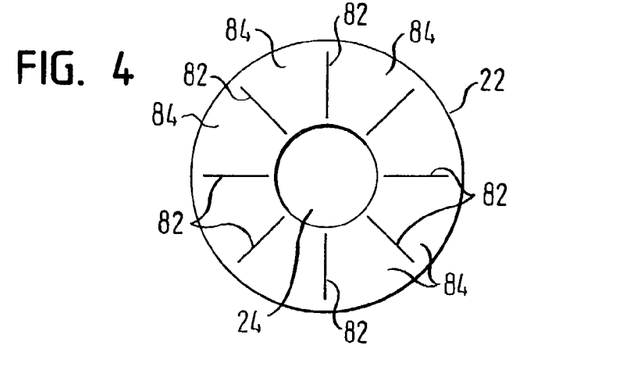
FIG. 4 is a plan view of a cover and of a hub cover of the airbag module in FIG. 1.

The cover 22 of polyamide is made in the form of a hood and has a circular opening 76 at the center of the hood whose cranked rim 78 engages into a groove 80 formed by the hub cover 24—which can bear the emblem of a vehicle manufacturer—and the projection 50. Starting radially from the opening 76, radially extending desired break lines 82 are formed (cf. FIG. 4) in the region of the cover 22 extending substantially parallel to the base 62.

On a triggering of the airbag module 10, gas is expanded in the pressure unit 36 or in the gas generator 18 and is blown into the folded airbag 20 through the mounting section 38 serving as a diffuser. The folded airbag 20 is hereby unfolded, with it being pressed toward the cover 22. The rim 78 is hereby pulled out of the groove 80. On a further unfolding of the airbag 20, the cover 22 tears along the desired break lines 82 while forming radial cover tongues 84 between the desired break lines 82, and the formed cover tongues 84 are bent upwardly and outwardly, whereby a further free unfolding of the airbag 20 is made possible. At the same time, the airbag mouths 62 and 64 are held behind the corresponding projections 48 and 50, with the airbag mouths 62 and 64 being substantially uniformly tautened radially.

To be able to attach the airbag 20 to the airbag holder 14 or to the airbag holder sections 16 and 16', the projections 48 and 50 each have the cut-outs 52 and 54 in the form of radially extending slots. The width of the cut-outs 52 and 54 is of equal size in the example and is selected such that the edge of the airbag mouths 62 and 64 can be guided through the cut-outs 52 and 54. It can, for example, be 1 mm larger than the thickness of the rims 66 and 68.

Figure 5A:
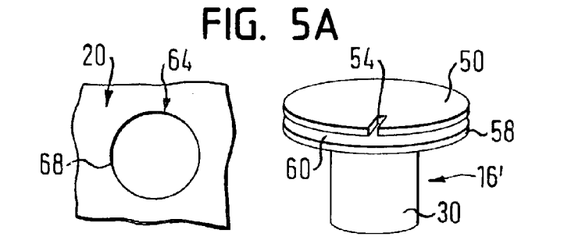
FIGS. 5A to C are part, perspective views of the airbag holder in FIG. 1 during different stages of the attaching of the airbag to the airbag holder.
Figure 5B:
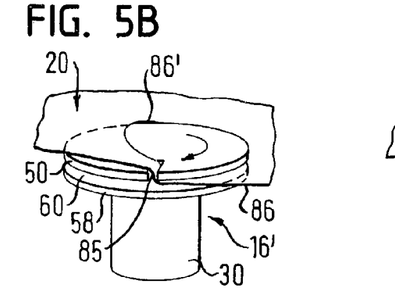
Figure 5C:
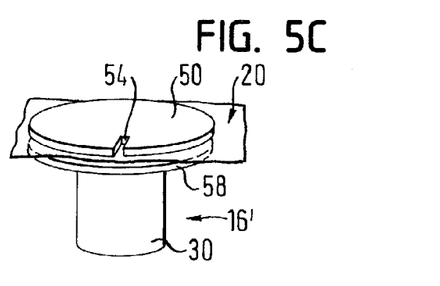

The attachment of the airbag shown schematically—for reasons of better illustration—in FIGS. 5A to 5C for the example of the airbag mouth 64 and of the projection 50, although the airbag mouth 62 is actually attached first.

The introduction section 85 of the rim 65 of the airbag mouth 64 is introduced into the cut-out 54 of the projection 50 such that first and second sections 86 and 86' adjacent to this are arranged on a first side of the projection facing the complementary projection 80 or on a second side of the projection opposite the first side (cf. FIG. 5B). The support element 12 with the airbag holder 14 is rotated out of this starting position such that the rim 68 of the airbag mouth 64 of the airbag 20 is guided completely behind the projection 50 into the end position in the course of the rotation (cf. FIG. 5C). Since the airbag holder ends above the projection 50, the section 86 can be inserted over a longer section into the groove 60 even without rotation so that the rotation does not have to be through 360°.

Figure 6:
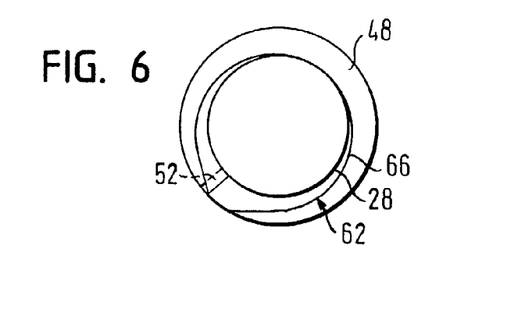
FIG. 6 is a schematic, partly sectioned view of the airbag module in FIG. 1 during the attaching of the airbag to an airbag holder section at the gas generator side.

The airbag mouth 62 is attached in a corresponding manner to the airbag holder section 16 formed as the base body by the projection 48, the base 26 and the mounting section 28. As shown in FIG. 6, first only a small first section of the rim 66 is initially guided under the projection 48 here, since the airbag mouth 62 is only limitedly movable on the side of the projection 48 facing the base 26 due to the presence of the mounting section 28. The rim 66 is then moved fully behind the projection 48 by a rotation of the support element 12 and thus of the airbag holder 14 through substantially 360°.

In a second preferred embodiment of the invention, an airbag module differs from the airbag module of the first embodiment by the formation of the cut-out in the projections 48 and 50 and of the airbag 20. For all other components, the statements on the first embodiment still apply and the same reference numerals are used.

The airbag differs from the airbag 20 in that it is made from a coated fabric whose coating results in a reinforcement of the rim in the region of the airbag mouth.

Figure 7:
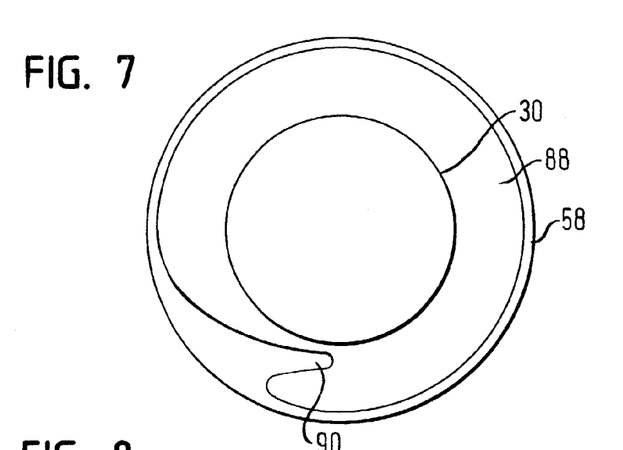
FIG. 7 is a schematic plan view of a projection of an airbag holder of an airbag module in accordance with a second preferred embodiment of the invention.

Shown very schematically in FIG. 7 for a projection 88 corresponding to the projection 50, the projection 88 formed as a flange and having, like the projection 50, two parallel, planar flange surfaces, has a cut-out 90 in the form of a bulge which extends in an inclined manner at a tangent about a circular, enveloping peripheral contour of the projection 88 and which allows an introduction of the airbag into the cut-out 90 and a further rotation of the airbag relative to the airbag holder section 16' formed as the base body by the projection 88, the complementary projection 58 and the hollow cylindrical holding section 30.

The projection 48 not shown in FIG. 7 and corresponding to the projection 50 has a correspondingly shaped cut-out.

In a third preferred embodiment of the invention, an airbag module differs from the airbag module of the first embodiment by a cut-out 92 in a projection 94 corresponding to the projection 50, with said cut-out 92 having the shape of a slot and corresponding to the cut-out 54 of the first embodiment. For all other components of the airbag module, the same statements apply as in the first embodiment and the same reference numerals are used.

Figure 8:
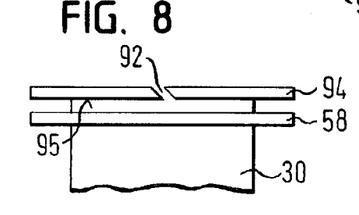
FIG. 8 is a schematic, part side view of an airbag holder of an airbag module in accordance with a third preferred embodiment of the invention.

In the projection 94, the recess 92 or the slot does not now extend, as in the first embodiment, parallel to a normal on a contact surface 95 of the projection 50, or of the projection 94, which the rim 68 contacts when the airbag 20 is pulled, but in an inclined manner to this (cf. FIG. 8). On an attachment of the airbag 20, a strong deformation of the airbag guided through the cut-out 92 or the slot is hereby avoided. Such a recess can also be provided independently in the projection 48.

In a fourth preferred embodiment of the invention, an airbag module differs from the airbag module in the first embodiment again by the formation of a projection 96 which corresponds to the projection 50. The other components of the airbag module are formed like the components of the airbag module of the first embodiment so that the same statements apply to these and the same reference numerals are used as in the first embodiment.

Figure 9:
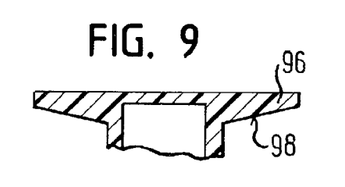
FIG. 9 is a schematic, part sectional view of an airbag holder of an airbag module in accordance with a fourth preferred embodiment of the invention with a conical contact surface.

The projection 96 shown in FIG. 9 and corresponding to the projection 50 has a conically shaped contact surface 98 which the rim 68 of the airbag 20 contacts areally when the airbag is pulled in the direction of the projection 96. With such a pulling in the direction of the projection 96, the airbag mouth 64 is therefore automatically centered on the projection 96 such that a gas impermeable contact results. The projection 48 can also be formed accordingly.

In a fifth embodiment, an airbag module differs from the airbag module in the first embodiment by the formation of a rim 100 of the airbag mouth 64 which corresponds to the rim 68 of the airbag mouth 64 in the first embodiment. For the other components, the same statements therefore apply as in the first embodiment and the same reference numerals are used.

Figure 10:
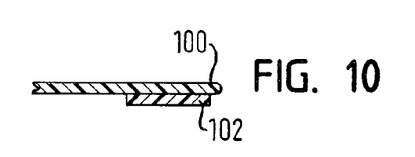
FIG. 10 is a schematic sectional view through a rim of an airbag of an airbag module in accordance with a fifth preferred embodiment of the invention.

The rim 100 of the airbag mouth 64 of the airbag 20 shown in FIG. 10 is formed by at least one layer of the airbag which is reinforced with a welded on, flat ring 102 which is made of the same plastic materials as the airbag 20, that is polyamide or nylon. This ring 102 can be connected to the layer of the airbag 20 by ultrasonic welding. A reinforcement of the rim 100 is hereby achieved against stretching along the rim 100. Alternatively, the ring can also be sewn one time or a multiple of times to the airbag, with the stitches also being able to pass directly through the ring if the ring is sufficiently flat.

In a sixth embodiment of the invention, an airbag module differs from the airbag module of the first embodiment by the shape of an airbag mouth 104 which corresponds to the airbag mouth 50 of the airbag of the first embodiment. For all other components of the airbag module, the same statements apply as to those of the airbag module of the first embodiment and the same reference numerals are used.

Figure 11:
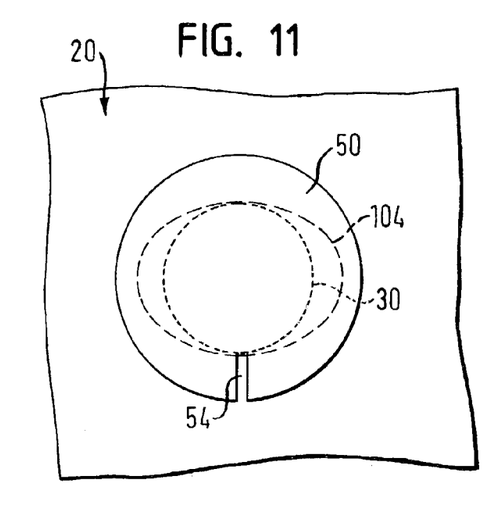
FIG. 11 is a schematic plan view of an airbag holder of an airbag module in accordance with a sixth preferred embodiment of the invention with an airbag attached thereto.

The airbag mouth 104 now has an elliptical shape, with the small main axis of the ellipse being longer than the diameter of the hollow cylindrical holder section 30, but shorter than the outer diameter of the projection 50 (cf. FIG. 11). The length of the longer main axis of the ellipse is only a little larger, for example 1 mm larger, than the diameter of the hollow cylindrical holding section 30 and smaller than the outer diameter of the projection 50.

For the attachment, the airbag mouth 104 is inserted into the cut-out 54 such that the longer main axis extends substantially parallel to the cut-out 64 formed as a radial slot. The rim of the airbag mouth 104 can thus be moved very far behind the projection 50 without a rotation or stretching.

The support element 48, with the hollow cylindrical holding section 30 serving as the base body, is now rotated out of this starting position relative to the airbag 20 until the airbag mouth 104 is arranged fully behind the projection 50 and the shorter main axis of the ellipse is arranged substantially parallel to the cut-out 54. In this end position, the cut-out 54 is largely covered by the airbag 20, while the elliptical shape simultaneously facilitates the attachment to the airbag holder section 16'.

The airbag module 62 can also be made correspondingly elliptical.

In a seventh embodiment of the invention, an airbag module differs from the airbag module of the first embodiment by a projection 106 which corresponds to the projection 50 of the airbag of the first embodiment. For all other components of the airbag module, the same statements apply as to that of the airbag module of the first embodiment and the same reference numerals are used.

Figure 12:
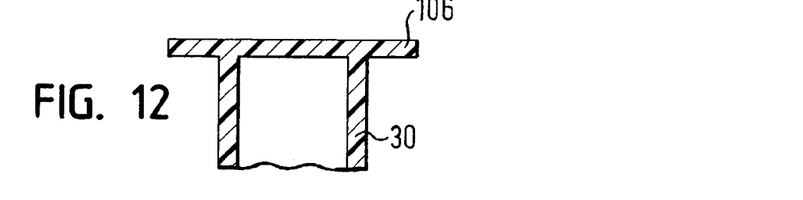
FIG. 12 is a schematic, part sectional view through an airbag holder of an airbag module in accordance with a seventh preferred embodiment.

The projection 106 differs from the projection 50 in the first embodiment in that no cut-out is provided and the outer diameter is selected differently. The projection 106 is therefore made as a fully peripheral flange (cf. FIGS. 12, 13A).

The airbag 64, which is circular in the non-deformed state, has a diameter which is larger than the outer diameter of the holding section 30 and smaller than the outer diameter of the projection 106. The peripheral contour of the airbag mouth 64 is therefore smaller than that of the projection 106 (cf. also FIG. 13C).

Furthermore, the diameter of the airbag module 64 and the outer diameters of the projection 106 of and of the holding section 30 are selected dependent on one another such that the method steps described in the following for the attaching of the airbag 20 behind the projection 106 to the airbag holder 14 can be carried out.

Figure 13A:
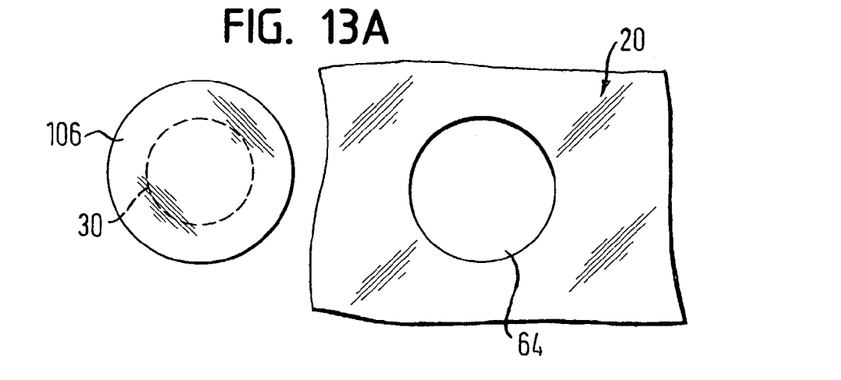
FIGS. 13A, B and C are schematic plan views of the airbag holder in FIG. 12 and of an airbag of the airbag modules in FIG. 12 in sequential stages of the attaching of the airbag to the airbag holder.
Figure 13B:
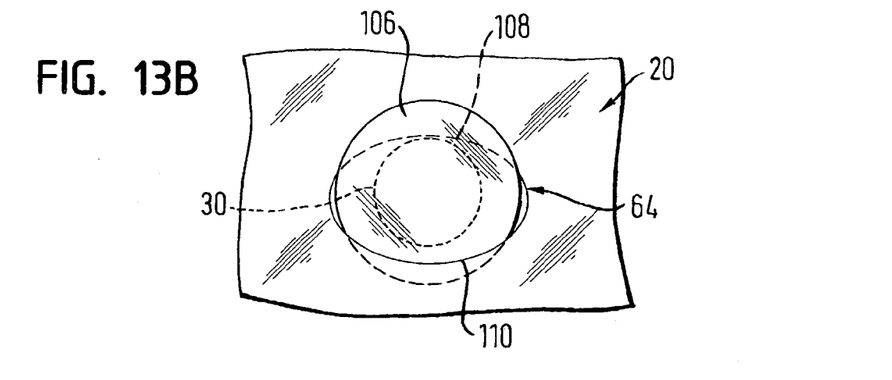
Figure 13C:
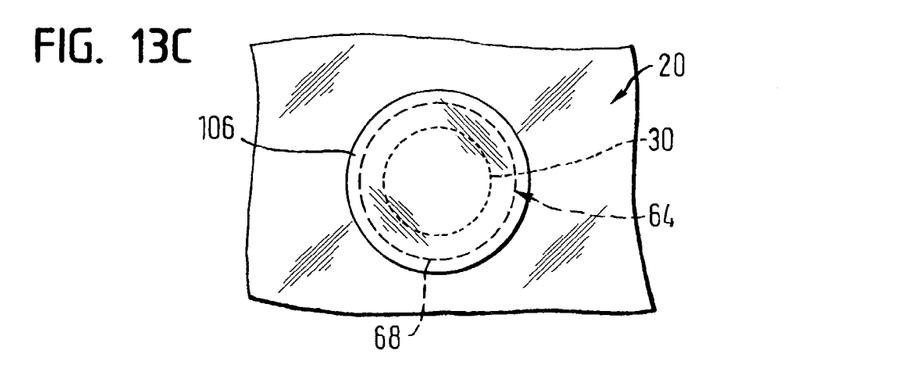

For the attachment of the airbag 20 to the airbag holder 14 illustrated in FIGS. 13A to 13C, the airbag mouth 64 is deformed into an ellipse-like shape and moved with a first section 108 behind the projection 106 onto a first side of the projection 106, with a second section 110 complementary to the first section 108 being arranged on a front, second side of the projection 106 remote from the first side (cf. FIG. 13B).

The complementary section 110 of the rim 68 of the airbag mouth 64 located on the second side of the projection 106 is now pulled over the corresponding edge of the projection 106, with the first section 108 of the rim 68 being pulled toward the holding section 30 (cf. FIG. 13B).

The diameter of the airbag mouth 64 is selected precisely such that the second section 110 of the airbag mouth 64 can be moved over the projection 106 substantially without any considerable stretching of the airbag mouth 64.

The airbag mouth 64 is now located behind the projection 106, with the edge 68 of the airbag mouth 64 engaging behind the projection 106 in the end position thus reached (cf. FIG. 13C) and a movement of the airbag mouth 64 over the projection is prevented.

The projection 48 can also be made correspondingly so that the airbag mouth 62 can be attached thereto with a corresponding method.

In an eighth preferred embodiment of the invention, an airbag module is made like the airbag module in accordance with the seventh preferred embodiment of the invention with the exception of the diameter of an airbag mouth 112 corresponding to the airbag mouth 64. The same reference numerals are therefore used for the same components and the statements in relation to these components also apply correspondingly to this embodiment.

The airbag mouth 112 now has a diameter which, as in the preceding embodiment, is smaller than the diameter of the projection 106 or larger than the outer diameter of the holding section 30. The diameter of the airbag mouth 112 is, however, selected such that the airbag mouth 112 has to be stretched for the attaching of the airbag behind the projection 106.

Figure 14:
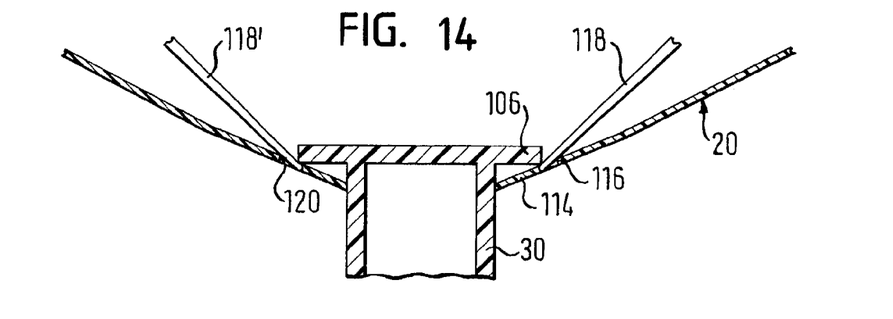
FIG. 14 is a schematic, part sectional view through an airbag holder and an airbag on its attaching to the airbag holder with an attachment method in accordance with an eighth preferred embodiment of the invention.
Figure 15:
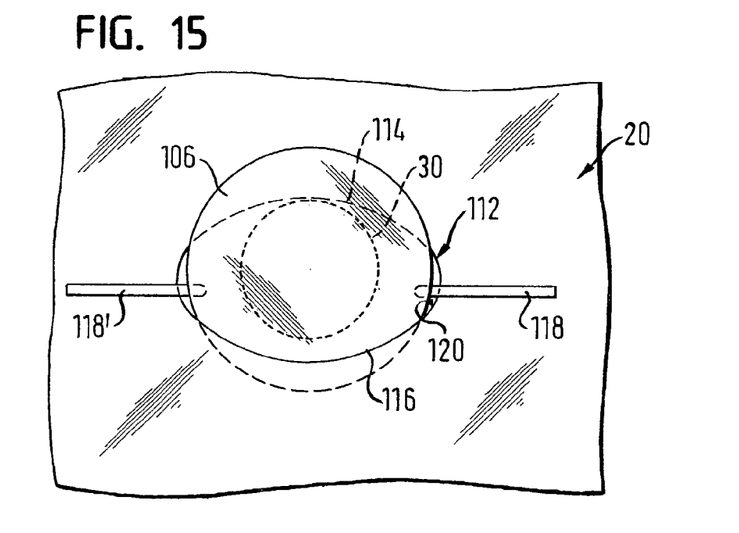
FIG. 15 is a schematic plan view of the airbag holder and the airbag in FIG. 14.

As in the preceding embodiment, for the installation of the airbag 20 to the airbag holder 14, the airbag mouth 112 is moved after an ellipsoid deformation onto the holding section 30 and with a first section 114 behind the projection 106, with a second section 116, complementary to the first section 114, being arranged on a front, second side of the projection 106 (cf. FIGS. 14 and 15).

To be able to stretch the airbag mouth 112, two lever tools 118 and 118' are now guided between a rim 120 of the airbag mouth 112 and the projection 106 in the region in which the rim 120 of the airbag mouth 112, starting from the first side of the projection 106, abuts a corresponding edge of the projection 106.

The airbag mouth 112 is stretched and the section 116 simultaneously guided behind the projection 106 by a relative movement of the lever tools 118 and 118' toward one another.

If the whole rim 120 of the airbag mouth 112 is now located behind the projection 106, the lever tools 118 and 118' are removed so that an image analogous to that of FIG. 13C substantially results.

The airbag mouth 62 can also be formed accordingly and be attached to the airbag holder section 16.

In a ninth preferred embodiment of the invention, an airbag module differs from the airbag module in the seventh embodiment only by the formation of a rim 122 of an airbag mouth, which corresponds to the airbag mouth 64, of an airbag 124 otherwise corresponding to the airbag 20 and by the formation of a projection 126 corresponding to the projection 106. Furthermore, the complementary projection 58 is missing. For the other components of the airbag module, the same statements therefore apply as to the seventh embodiment and the same reference numerals are used.

Figure 16:
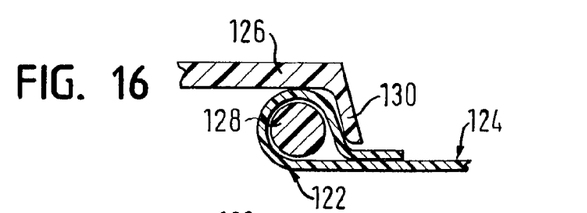
FIG. 16 is a schematic, part sectional view of a marginal region of a projection of an airbag holder of an airbag module in accordance with a ninth preferred embodiment of the invention with a rim of an airbag mouth of an airbag.

In this embodiment, the rim 122 of the airbag mouth of the airbag 124 is reinforced against extensions tangentially to the rim 122 in that a flexible reinforcement ring 128 of the same plastic material as the airbag (124) is sewn into a fold of the airbag 124 along the rim 122 (cf. FIG. 16).

The projection 126, which corresponds to the projection 106 with the exception of the formation of its rim region, has a peripheral collar 130 at its rim on the first side facing the airbag in the end position which forms an undercut.

The height of the collar 130 has been selected in this connection such that the reinforced rim 122 of the airbag 124 in the end position is pulled toward the collar 130 when the airbag 124 is pulled. A sliding of the rim 122 of the airbag 124 from the projection 106 is thus avoided.

The projection 48 and the rim 66 of the airbag mouth 62 can be formed accordingly.

In a tenth preferred embodiment of the invention, an airbag module substantially differs from an airbag module in accordance with the ninth preferred embodiment by the formation of a rim 132 of an airbag mouth of an airbag 134. For the other components of the airbag module, the same statements therefore apply as to the ninth embodiment and the same reference numerals are used.

Figure 17:
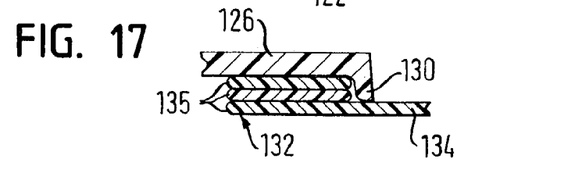
FIG. 17 is a schematic, part sectional view of a marginal region of a projection of an airbag holder and of a rim of an airbag mouth of an airbag of an airbag module in accordance with a tenth preferred embodiment of the invention.

The rim is here reinforced by three rings of airbag material or fabric which are arranged lying on one another and are sewn to one another and to the airbag 134 with one or more stitches (cf. FIG. 17).

The collar 130 of the projection 106 is, in accordance with the thickness of the rim 132, less high than in the preceding, ninth embodiment.

The projection 48 and the airbag mouth 62 can also be made accordingly here.

The projections in the first to sixth embodiments can be made in accordance with those in the ninth and/or tenth embodiment, with the complementary projection 58 being able to be missing if the holder 14 is made in one piece.

Furthermore, the different kinds of reinforcement of the airbag mouth in the second, fifth, ninth and tenth embodiments can be combined with one another.

In an eleventh embodiment of the invention, an airbag module differs from the airbag module of the first embodiment by the formation of the airbag 20. For the other components, the same statements apply as to those of the first embodiment and the same reference numerals are used.

Figure 18:
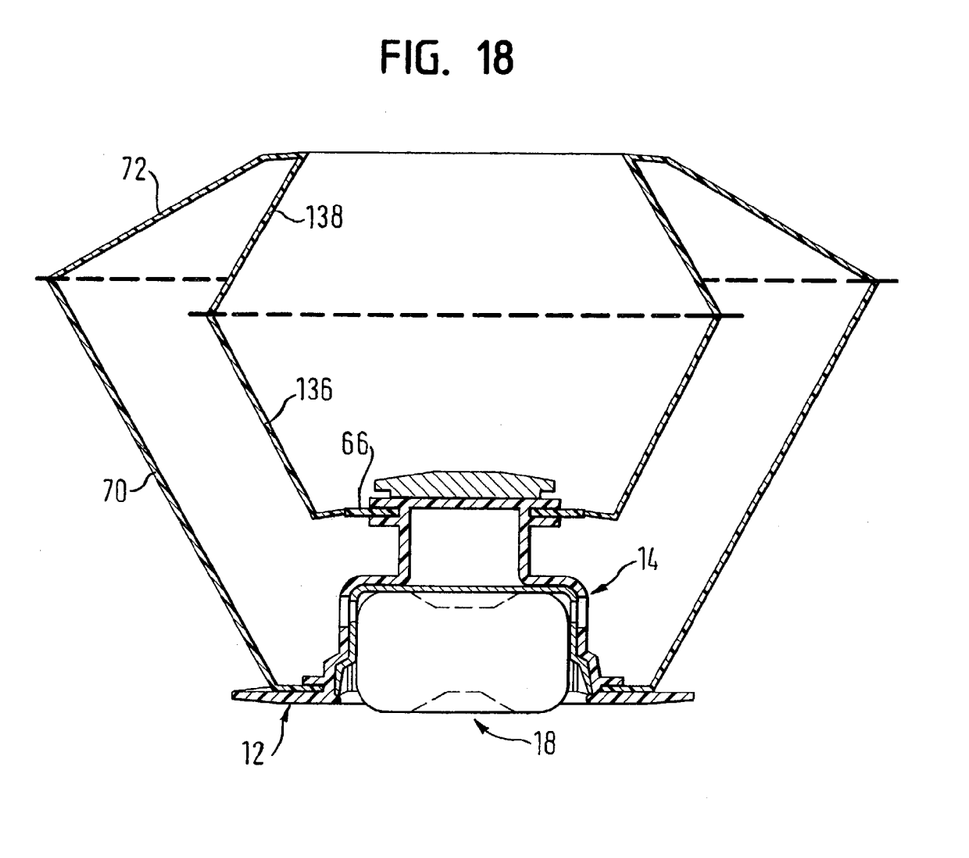
FIG. 18 is a schematic, part sectional view of an airbag module in accordance with an eleventh preferred embodiment of the invention.

Instead of the tubular airbag part 74, two disk-like airbag parts 136 and 138, which each have openings at their centers, are sewn to one another along their outer peripheries (cf. FIG. 18). The opening of the airbag part 138 is sewn to the airbag part 72, while the opening of the airbag part 136 forms the airbag mouth 64 which is attached to the airbag holder 14.

In a twelfth embodiment of the invention, an airbag module differs from the airbag module of the first embodiment in turn by the formation of the airbag 20. For the other, same components, the same statements therefore apply and the same reference numerals are used as in the first embodiment.

Figure 19:
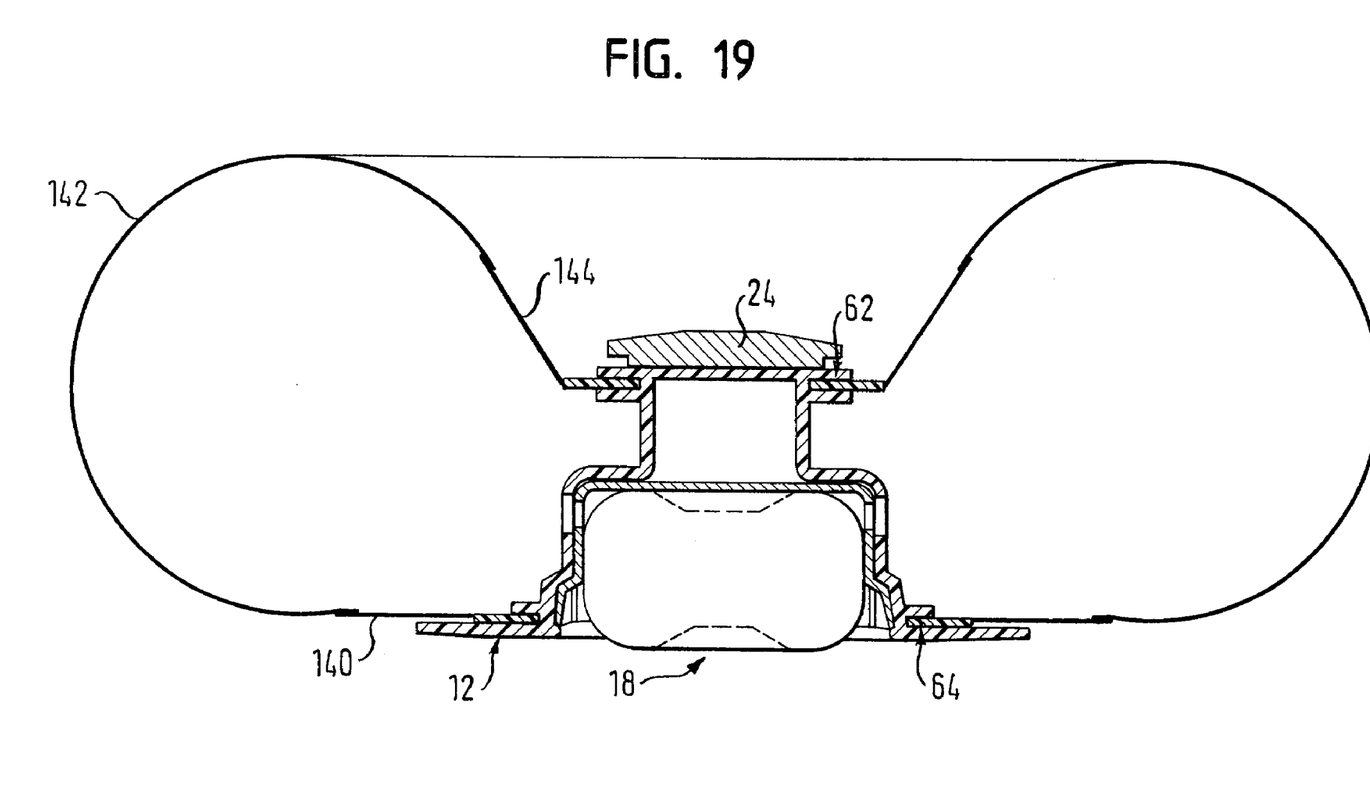
FIG. 19 is a schematic, part sectional view of an airbag module in accordance with a twelfth preferred embodiment of the invention.

The airbag is formed by three airbag parts 140, 142 and 144 (cf. FIG. 19).

The airbag part 142 is made in cylindrical shape, with the diameter of the cylinder corresponding to the maximum diameter of the inflated airbag. The airbag parts 140 and 142 are disk-shaped, for example with an outer diameter which approximately corresponds to a third of the diameter of the cylindrical airbag part 14, and formed with central openings. The cylindrical airbag part 142 is folded a multiple of times at the edges of the openings of said cylindrical airbag part 142 and is sewn to the outer rims of the airbag parts 140 and 144. The openings in the airbag parts 140 and 144 then form the airbag mouths 62 and 64.

The embodiments can be transferred accordingly to airbags having only one airbag mouth, with, for example, the projection 48, or in particular the projection 50, and corresponding projections in other embodiments being able to be omitted. The diffuser can then be designed accordingly in each case, when the projection 48 is dispensed with, for example by openings in the terminal surface 32.

The invention claimed is:

1. An airbag module comprising
   an airbag holder having a base body and a projection formed on a peripheral surface of the base body; said projection having a first side and a second side and further comprising a cut-out extending from the first side to the second side, and
   an airbag comprising an airbag mouth having a peripheral contour smaller than the projection and engaging the base body adjacent the first side of the projection;
   wherein the cut-out is sized and shaped to receive an introduction section of the airbag mouth such that first section of the airbag mouth adjoining the introduction section is arranged on the first side of the projection and a second section of the airbag mouth is arranged on the second side of the projection and further such that rotational movement of the airbag mouth relative to the base body passes the second section of the airbag mouth through the cut-out into position on the first side of the projection, whereupon both the first section and the second section of the airbag mouth are disposed adjacent the first side of the projection.

2. An airbag module in accordance with claim 1, characterized in that the cut out is a slot passing through the projection.

3. An airbag module in accordance with claim 2, wherein the airbag mouth has a thickness, and wherein the slot is less than 2 mm wider than the thickness of the airbag mouth.

4. An airbag module in accordance with claim 2 wherein the first side of the projection is planar.

5. An airbag module in accordance with claim 4 wherein the slot comprises a contact surface that is inclined relative to the first side of the projection.

6. An airbag module in accordance with claim 2 wherein the first side of the projection is conical.

7. An airbag module in accordance with 1 wherein the base body has a circular cross section adjoining the projection.

8. An airbag module in accordance with claim 1 wherein the airbag mouth is coated for reinforcement.

9. An airbag module in accordance with claim 1 wherein the projection is a first projection, and wherein the base body further comprises a second projection spaced apart from the first projection to form a groove such that the mouth of the airbag is received in the groove.

10. An airbag module in accordance with claim 1, wherein the projection is a first projection, and wherein the airbag mouth is a first airbag mouth, and
   wherein the airbag holder comprises a second projection axially offset from the first projection, and
   wherein the airbag is a toroidal airbag comprising a second airbag mouth engaging the base body adjacent the second projection.

11. A method for the attachment of an airbag to an airbag holder, said method comprising
   providing an airbag having an airbag mouth;
   providing an airbag holder comprising a base body and a projection formed at a peripheral surface of the base body, said projection comprising a first side and a second side and further comprising a cut-out extending from the first side to the second side,
   introducing an introduction section of the airbag mouth into the cut-out such that a first section of the airbag mouth is adjacent the first side of the projection and a second section of the airbag mouth is adjacent the second side of the projection; and
   moving the airbag mouth rotationally relative to the base body to pass the second side through the cut-out to the first side, such that both the first section and the second section engage the base body adjacent the first side of the projection.

* * * * *